United States Patent [19]

Amos

[11] Patent Number: 4,541,377
[45] Date of Patent: Sep. 17, 1985

[54] PISTON DOME

[76] Inventor: Louis A. Amos, 266 Glenwood Rd., Wheeling, W. Va. 26003

[21] Appl. No.: 694,152

[22] Filed: Jan. 23, 1985

[51] Int. Cl.[4] .............................................. F02F 3/24
[52] U.S. Cl. ................................. 123/307; 123/193 P; 123/661
[58] Field of Search ........... 123/657, 661, 671, 193 R, 123/193 P, 306–308, 659

[56] References Cited

U.S. PATENT DOCUMENTS

| 1,983,198 | 12/1934 | Steiger | 123/661 |
| 2,394,576 | 2/1946 | Winfield | 123/659 |
| 2,672,852 | 3/1954 | Miller | 123/306 |
| 3,298,332 | 1/1967 | Elsbett | 123/308 |
| 3,416,501 | 12/1968 | De Coye De Castelet | 123/306 |
| 4,009,702 | 3/1977 | Mayer | 123/276 |
| 4,041,923 | 8/1977 | Konishi et al. | 123/661 |
| 4,090,479 | 5/1978 | Kaye | 123/306 |
| 4,162,661 | 7/1979 | Nakanishi et al. | 123/661 |
| 4,166,436 | 9/1979 | Yamakawa | 123/307 |
| 4,271,803 | 6/1981 | Nakanishi et al. | 123/308 |
| 4,324,214 | 4/1982 | Garcea | 123/661 |
| 4,359,027 | 11/1982 | Scharpf | 123/661 |

FOREIGN PATENT DOCUMENTS

| 53-17808 | 2/1978 | Japan | 123/307 |
| 0101778 | 6/1941 | Sweden | 123/193 P |

Primary Examiner—Craig R. Feinberg
Attorney, Agent, or Firm—Laubscher & Laubscher

[57] ABSTRACT

An improved dome-shaped piston head is disclosed characterized by a plurality of channels, depressions, and recesses which enhance the flow of an air-fuel mixture around the piston head in a combustion chamber and the flow of exhaust gases from the chamber. Specifically, the dome-shaped head portion includes a pair of depressions in its intake and exhaust side portions for increasing swirl of the air-fuel mixture. The intake side portion of the piston head also includes first and second channels which cooperate with the intake depression to direct the incoming air-fuel mixture around the piston dome and upwardly into the combustion chamber with swirling turbulence. The exhaust side portion of the piston head includes a pair of tapered recesses on opposite sides of the exhaust depression for directing exhaust gases toward the exhaust opening.

6 Claims, 11 Drawing Figures

PISTON DOME

BACKGROUND OF THE INVENTION

The present invention relates to an improved dome-shaped head portion for the pistons of an internal combustion engine which allows the engine to transfer the air-fuel mixture across and around the piston head more efficiently when the engine goes from the exhaust to the intake stroke.

In a conventional four-stroke internal combustion engine, when the piston is at top dead center between the exhaust and intake strokes, both the intake and exhaust valves are open. The exhaust valve closes as the piston begins the intake stroke. Atmospheric pressure forces the air-fuel mixture through the intake port to fill the void created by the displacement of the piston in the combustion chamber. When the piston reaches bottom dead center, the intake valve closes. The engine then goes through the compression and explosion strokes. When the piston is at bottom dead center after the explosion stroke, the exhaust valve opens. The piston then rises on the exhaust stroke, expelling the burned gases from the combustion chamber. When the piston is at top dead center, both the intake and exhaust valves are again open.

BRIEF DESCRIPTION OF THE PRIOR ART

Various piston head designs for increasing the efficiency of combustion of an internal combustion engine are well-known in the prior art as evidenced by the U.S. patents to Steiger U.S. Pat. No. 1,983,198, Konishi et al U.S. Pat. No. 4,041,923, Nakanishi et al U.S. Pat. No. 4,162,661, Yamakawa U.S. Pat. No. 4,166,436, Nakanishi et al U.S. Pat. No. 4,271,803, Garcea U.S. Pat. No. 4,324,214, and Scharpf U.S. Pat. No. 4,359,027. In each of these patents, a reconfigured piston head is disclosed which is designed to increase the swirl or squish of the combustion mixture within the combustion chamber. In the Yamakawa patent, for example, the piston has a pair of grooves in the top surface thereof which create a strong swirling motion of the combustible mixture as the piston rises to its top dead center position.

Other piston head designs are known in the patented prior art which enhance the flow of an air-fuel mixture and combustion gases through the combustion chamber. The U.S. patent to Miller U.S. Pat. No. 2,672,852 discloses a piston head having an annular depression which facilitates movement of gases entering the chamber when the piston is at top dead center following the exhaust stroke toward the exhaust valve. Similarly, the U.S. patent to Winfield U.S. Pat. No. 2,394,576 discloses a cylinder head having cut-back portions which permit intake and exhaust gases to flow smoothly around the edges of the intake and exhaust valves.

While the prior piston assemblies normally operate quite satisfactorily, they possess certain inherent drawbacks which limit their practicality. In order to operate properly, each of the prior devices requires some modification to other parts of the engine. These modifications must be performed by a skilled mechanic at great expense. Moreover, the prior devices are not designed both to increase swirl of the combustion gases while also guiding gases from the intake to the exhaust around the piston dome.

The present invention was developed in order to overcome these and other drawbacks of the prior art by providing a replacement piston for a conventional four-stroke overhead valve hemispherical engine wherein the piston has a uniquely configured dome-shaped head portion. The piston dome of the present invention provides improved mixing of the air-fuel mixture and better exhaust of the burned gases. It also cools the piston, allows the engine to be run at higher RPM's, the provides better gas mileage, while keeping the engine in the proper compression ratio for burning today's lower octane gasolines.

SUMMARY OF THE INVENTION

Accordingly, it is a primary object of the present invention to provide an improved dome-shaped piston head portion having intake and exhaust side portions each including a symmetrical depression arranged intermediate the piston axis and the peripheral edge of the head portion. A first channel is arranged adjacent the base of the intake side portion for directing the air-fuel mixture from the combustion chamber intake opening around the dome-shaped head. The intake side portion of the dome also contains a second channel arranged between the first channel and the intake depression for directing the air-fuel mixture upwardly to produce a swirling turbulent flow when the piston is displaced toward the combustion chamber. The exhaust side portion of the piston head contains a pair of first tapered recesses on opposite sides of the exhaust depression for directing exhaust gases from the combustion chamber toward the exhaust opening. During operation of the engine, the air-fuel mixture is conveyed through the combustion chamber more efficiently to increase the efficiency of the engine.

According to a more specific object of the invention, the intake side portion of the piston head also includes a pair of second tapered recesses for cooling the piston, and the exhaust side portion of the piston head includes a horizontal planar portion adjacent the second tapered recesses and the exhaust depression to provide clearance between the piston head and the exhaust valve.

According to another object of the invention, the first channel has a generally U-shaped horizontal cross-sectional configuration and the second channel has a generally V-shaped horizontal cross-sectional configuration.

According to a further object of the invention, the depth of the first and second channels decreases in the direction of the extremities thereof, respectively.

BRIEF DESCRIPTION OF THE FIGURES

Other objects and advantages of the subject invention will become apparent from a study of the following specification when viewed in the light of the accompanying drawing, in which.

DETAILED DESCRIPTION

Referring first to FIGS. 1–4, a piston according to the prior art is shown. The piston 2 includes a cylindrical body portion 4 which is arranged within a cylinder of a four-stroke internal combustion engine and a head portion 6 which extends into the combustion chamber of the engine when the piston is in its top dead center position.

Figure 1:
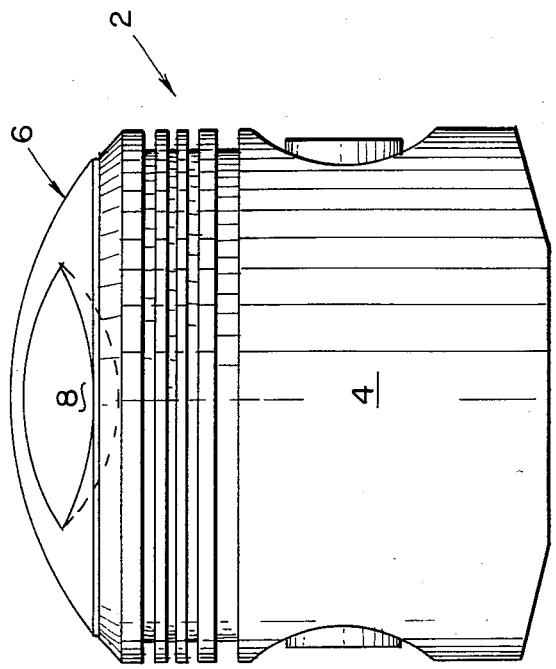
FIGS. 1, 2, and 3 are front, side, and top plan views, respectively, of a conventional piston head.
Figure 2:
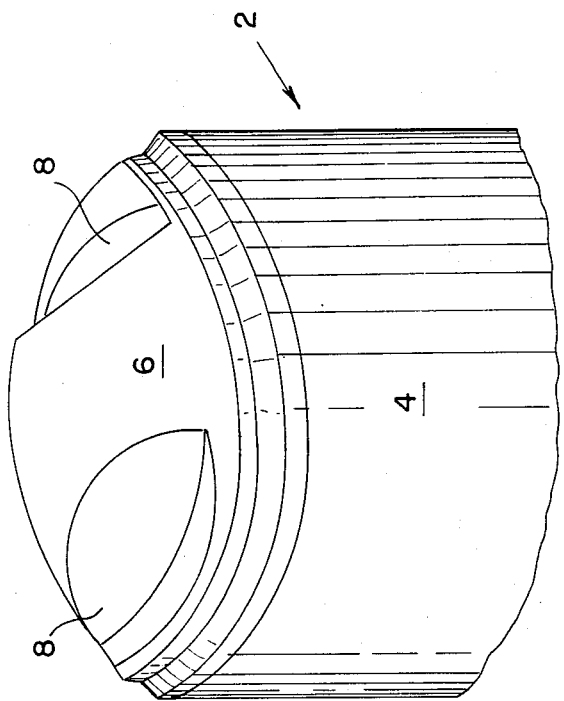
Figure 3:
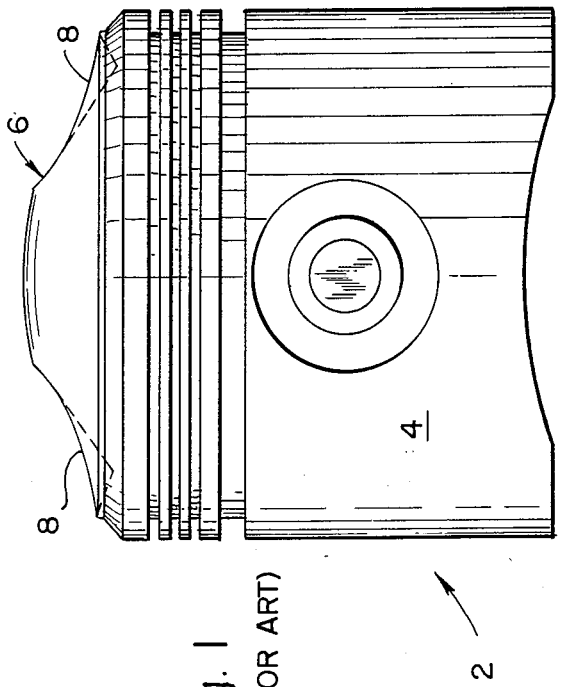
Figure 4:
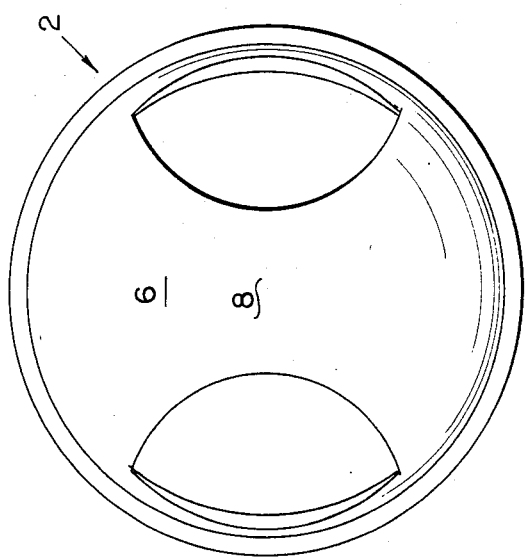
FIG. 4 is an isometric view of the conventional piston head of FIGS. 1-3.
Figure 5:
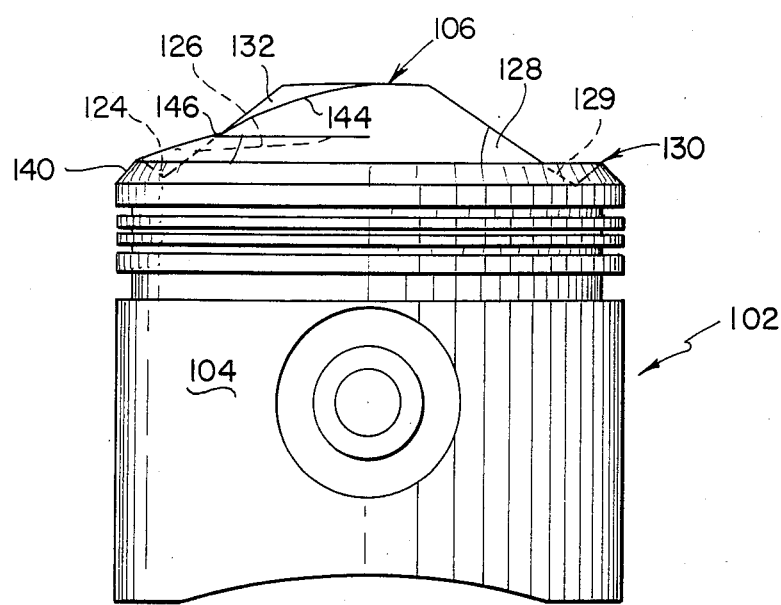
FIGS. 5, 6, 7, and 8 front, top, left side, and right side plan views, respectively, of the improved piston head according to the invention.

As shown in FIGS. 2 and 4, the head portion of the piston has an arcuate dome-shaped configuration. On either side of the dome is a depression 8 which serves to increase the swirl of an air-fuel mixture within the combustion chamber of the engine as the piston rises in the cylinder.

The improved piston head according to the invention is shown in FIGS. 5–9. Like the conventional piston, the piston 102 of the subject invention is preferably made of an aluminum alloy and includes a cylindrical piston body portion 104 and an arcuate dome-shaped head portion 106 having opposed recesses 108 symmetrically arranged intermediate the piston axis and the peripheral edge of the piston head portion for increasing swirl of the air-fuel mixture.

Figure 10:
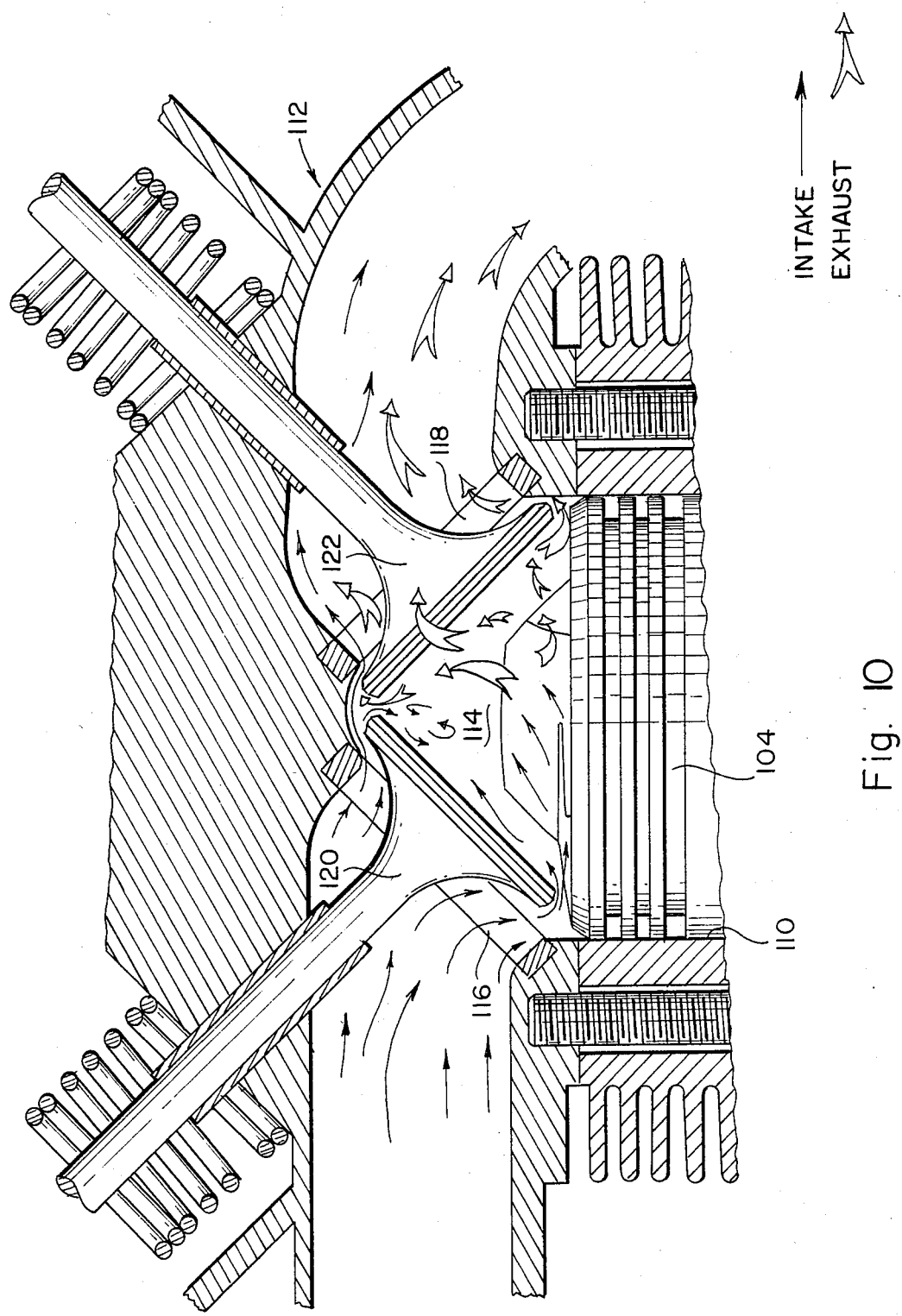
FIG. 10 is a partial sectional view of a four stroke combustion engine illustrating the piston head of the present invention relative to one another and a cylinder beneath the combustion chamber.

As shown in FIG. 10, the piston body portion 104 is mounted in the cylinder 110 of a four stroke internal combustion engine 112. The engine includes a combustion chamber 114 having an intake opening 116 through which an air-fuel mixture may enter the chamber and an exhaust opening 118 through which exhaust gases exit the chamber. An intake valve 120 is operable to open and close the intake opening and an exhaust valve 122 is operable to open and close the exhaust opening in a conventional manner.

A unique advantage of the present invention is that no machining to the valves, cylinder, or intake and exhaust openings of a standard four stroke engine is required for operation of the new piston. Rather, the improved piston according to the invention is merely substituted for the conventional piston in the engine. The substitution may be carried out during construction of the engine or, after use, by a mechanic in a machine shop.

Referring once again to the drawing, the piston head 106 includes intake 106a and exhaust 106b side portions defined by a vertical plane A (FIG. 6) which bisects the piston through the axis thereof. When the piston is mounted in the cylinder of the engine as shown in FIG. 10, the intake side portion 106a of the piston head is arranged adjacent the combustion chamber intake opening 116 and the exhaust side portion 106b of the piston head is arranged adjacent the combustion chamber exhaust opening 118.

Figure 6:
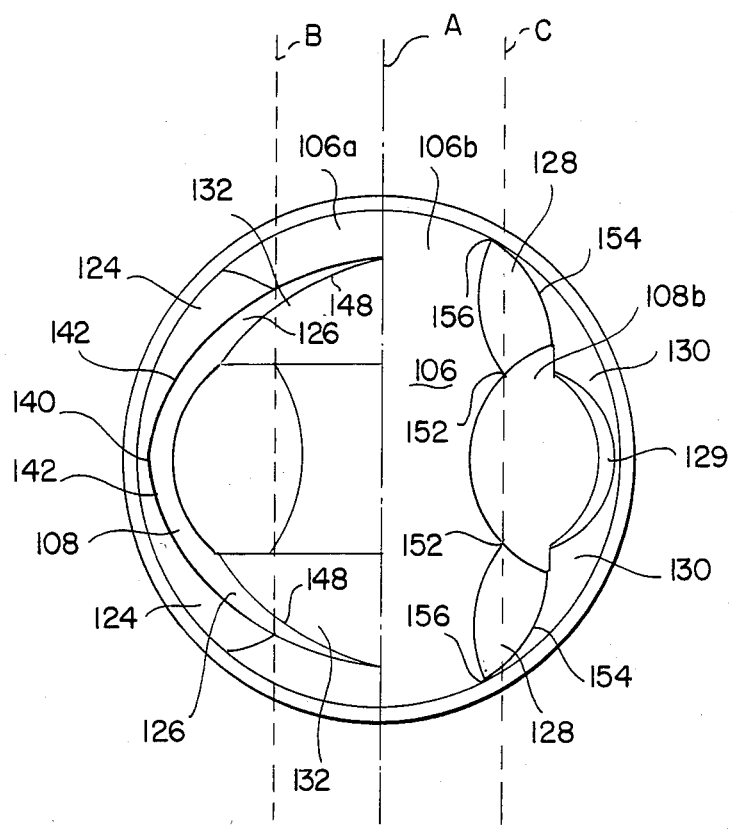
Figure 7:
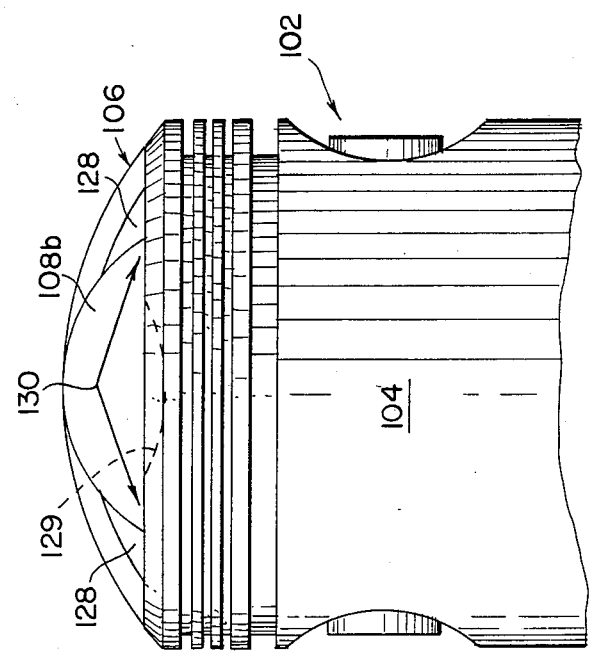
Figure 8:
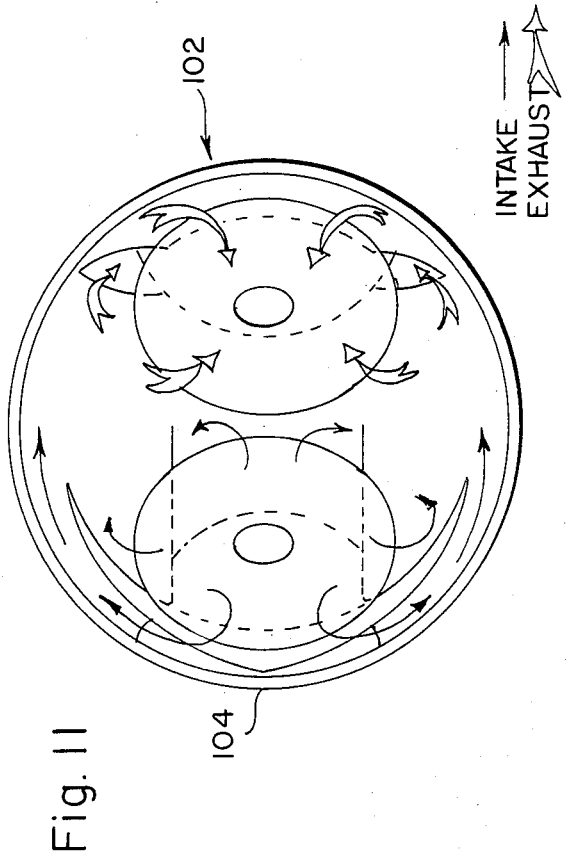
Figure 9:
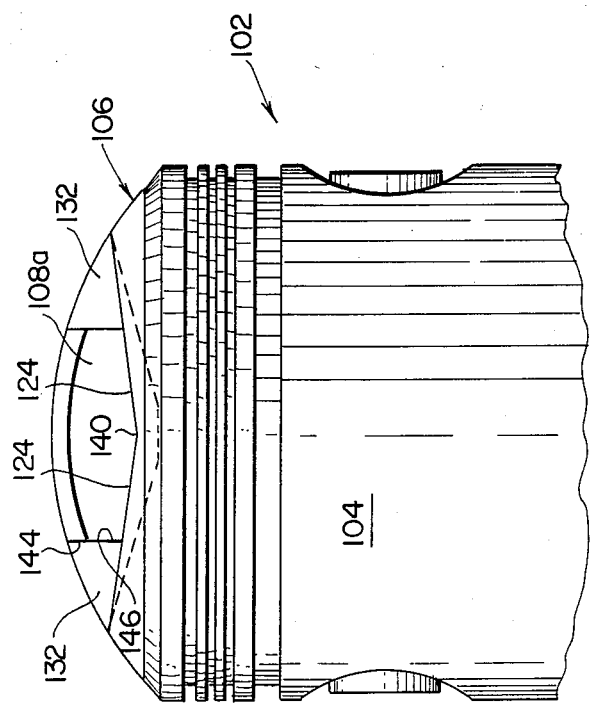
FIG. 9 is an isometric view of the piston head of FIGS. 5-8.

The piston head intake side portion 106a contains a first channel 124 which has a generally U-shaped horizontal cross-sectional configuration and a V-shaped vertical cross-sectional configuration and which extends along the circumference of the piston head portion adjacent the base thereof. As shown in FIG. 6, the extremities of the first channel extend rearwardly but terminate well before the plane A defining the intake and exhaust sides of the piston head 106. The depth of the first channel decreases in the direction of the extremities thereof, as shown more particularly in FIG. 5. Owing to its proximity adjacent the intake opening and to its orientation within the piston head intake side portion 106a, the first channel directs the incoming air-fuel mixture from the intake opening around the dome of the piston head portion 106 as will be developed in greater detail below.

A second channel 126 is provided in the piston head intake side portion 106a between the first channel 124 and the intake depression 108a as shown in FIG. 6. The second channel has a generally V-shaped horizontal cross-sectional configuration, the extremities of which extend adjacent the plane A which defines the intake and exhaust side portions of the piston head. Like the first channel, the depth of the second channel decreases in the direction of the extremities thereof. Preferably, the initial depth of the first channel 124 is greater than that of the second channel 126. The second channel 126 directs the incoming air-fuel mixture from the first channel 124 upwardly into the combustion chamber. In cooperation with the depression 108a contained in the intake side portion of the piston head, the second channel 126 imparts a swirling turbulence within the air-fuel mixture to create better mixing thereof.

The exhaust side portion 106b of the piston head contains a pair of first tapered recesses 128 adjacent the base of the head portion 106 on opposite sides of the exhaust depression 108b. The tapered recesses serve to direct exhaust gases from around the dome of the head portion toward the exhaust opening 118 of the combustion chamber.

A third channel 129 extends along the base of the exhaust recess 108b. The third channel has a V-shaped vertical cross-sectional configuration.

An arcuate horizontal planar portion 130 is also provided in the exhaust side portion 106b of the piston head diametrically opposite the first and second channels and adjacent the circumferential base portion of the piston head. As shown in FIG. 6, the planar portion, which is formed by cutting away a portion of the piston head dome, extends continuously between the first tapered recesses 128 and across the third channel 129. The cutaway planar portion provides greater clearance around the exhaust valve 122 so that a greater quantity of exhaust gases may leave the combustion chamber through the exhaust opening when the piston is at top dead center.

Tests have shown that heat builds up in the piston head on opposite sides of the intake recess 108a contained in the intake side portion 106a of the piston head. Accordingly, in the piston head of the present invention, a portion of the dome is removed from these areas to define a pair of second tapered recess 132 which assist in cooling the piston head.

Removal of material from the arcuate piston dome to depressions is controlled so that an equal amount of material is removed from both the intake and exhaust side portions of the piston head, thereby balancing the head weight resulting in good wear characteristics. The decreased weight of the piston also allows the engine to run smoothly and more efficiently.

In accordance with a preferred embodiment of the invention, the height of the piston head portion 106 is that which provides a 10:1 compression ratio. The quantity of material removed to form the channels and depressions is critical, in order to bring the compression down to an 8:1 ratio. The specific relationship between the grooves and depressions of the preferred embodiment will be defined with reference to FIGS. 5–8.

As set forth above, the piston dome is bisected into intake 106a and exhaust 106b side portions by the vertical plane A. Each side portion is further divided into equal sections by the imaginary planes B and C, respectively, which are parallel to the plane A.

The first channel is defined by a pair of planar wall members which are joined at point 140 and which diverge at an angle of between 145° and 160°, each with a rise of between 12° and 40° toward the plane A. The rise normally depends upon the height and diameter of the piston. The inner most edge 142 of the channel 124 extends to the plane B.

The depressions 132 in effect define a new dome having a height less than the head portion 106. The line 144 extending from the plane A to the point 146 at the intersection of the intake recess 108a and the second channel 126 defines the top of the new dome.

The second channel 126 extends along lines 148 adjacent the bottom of the depressions 132 and along a line 150 at the bottom of the intake recess 108a, whereby the second channel is intermediate the first channel and the depressions and intake recess.

Turning to the exhaust side portion 106b, the recesses 128 originate at the intersection 152 of the plane C and the exhaust recess 108b. The bottom edges 154 of the recess are horizontal and extend from the base of the recess 108b to the edge of the dome as shown by points 156. The planar portion 130 extends continuously between the edge of the piston dome and the pair of recesses 128 as shown in FIG. 6.

OPERATION

Figure 11:
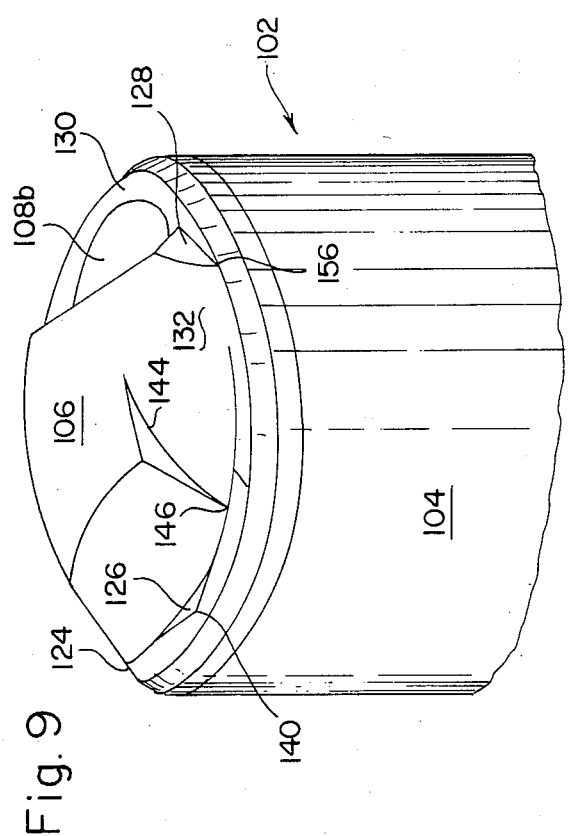
FIG. 11 is a top view of the piston head of FIG. 10 illustrating the intake and exhaust flows around the piston head relative to the head portions of the intake and exhaust valves.

The operation of the piston head according to the invention will be described with reference to FIGS. 10 and 11. When the piston 102 is at the top dead center position, both the intake 120 and exhaust 122 valves are open. As the piston moves downwardly through the engine cylinder 110 during the intake stroke, the exhaust valve 122 closes. Displacement of the piston creates a vacuum in the combustion chamber 114 which draws the air-fuel mixture into the chamber through the intake opening 116. When the piston reaches its bottom dead center position, the intake valve 120 closes. The engine then goes through the compression and explosion strokes. During compression, the air-fuel mixture flows about the piston dome 106 owing to the first channel and swirls upwardly owing to the second channel 126 and the intake side portion depression 108a. Because of the improved flow of the air-fuel mixture, a greater explosive force is obtained within the combustion chamber, thereby increasing the explosive force on the piston during the explosion stroke. After the explosion stroke, with the piston at its bottom dead center position, the exhaust valve 122 opens. The expanding exhaust gases exit the combustion chamber through the exhaust opening 118 as the piston rises during the exhaust stroke. When the piston reaches its top dead center position, the intake valve 120 opens. The force of the exhaust helps draw the air-fuel mixture into the combustion chamber, while the force of the intake helps push the remaining exhaust gases out of the chamber.

Accordingly, with the improved piston head design, complete exchange of intake and exhaust gases occurs during each cycle of the engine.

While in accordance with the provisions of the patent statutes the preferred forms and embodiments of the invention have been illustrated and described, it will become apparent to those skilled in the art that various changes and modifications may be made without deviating from the inventive concepts set forth above.

What is claimed is:

1. In an internal combustion engine including at least one combustion chamber having an intake opening for introduction of an air-fuel mixture into the chamber and an exhaust opening for removal of exhaust gases from the chamber, valve means for opening and closing the intake and exhaust openings, and a generally cylindrical piston which reciprocates along its longitudinal axis relative to the chamber, the improvement which comprises an arcuate dome-shaped piston head portion (106) extending normal to the piston axis and having intake and exhaust side portions (106a, 106b) opposite the chamber intake and exhaust openings, respectively, said head portion including (a) a pair of depressions (108a, 108b) symmetrically arranged in said intake and exhaust side portions, respectively, intermediate the piston axis and a peripheral edge of said head portion;

(b) first channel means (124) arranged adjacent a base of said head intake side portion for directing the air-fuel mixture from the intake opening around said dome-shaped head portion;

(c) second channel means (126) arranged between said first channel means and said intake side portion depression for directing the air-fuel mixture upwardly to produce a swirling turbulent flow when the piston is displaced toward the combustion chamber; and (d) a pair of first tapered recesses (128) arranged in said head exhaust side portion on opposite sides of said exhaust depression, respectively, for directing exhaust gases from the combustion chamber toward the exhaust opening, whereby during operation of the engine, the air-fuel mixture is conveyed through the combustion chamber more efficiently when the engine passes from an exhaust to an intake stroke, thereby to increase efficiency of the engine.

2. Apparatus as defined in claim 1, wherein said dome-shaped head portion further includes a pair of second tapered recesses (132) arranged in said head intake side portion on opposite sides of said intake depression, respectively, for cooling said head portion.

3. Apparatus as defined in claim 2, wherein said dome-shaped head portion further includes a horizontal planar portion (130) in the exhaust side portion thereof adjacent said first tapered recesses and said exhaust depression, thereby to increase the clearance between said piston head portion and the exhaust opening exhaust valve.

4. Apparatus as defined in claim 3, wherein said first channel means has a generally U-shaped horizontal cross-sectional configuration.

5. Apparatus as defined in claim 4, wherein said second channel means has a generally V-shaped horizontal cross-sectional configuration, extremities of which extend to points intermediate extremities of said first channel means and a junction of said head intake and exhaust side portions.

6. Apparatus as defined in claim 5, wherein the depth of said first and second channel means decreases in the direction of the extremities thereof, respectively.

* * * * *